Patented Sept. 14, 1937

2,093,146

UNITED STATES PATENT OFFICE 2,093,146

PRODUCTION OF ACETALDEHYDE FROM ACETYLENE

Ernst Eberhardt, Ludwigshafen-on-the-Rhine, Germany, assignor to I. G. Farbenindustrie Aktiengesellschaft, Frankfort - on - the - Main, Germany No Drawing. Application September 20, 1935, Serial No. 41,375. In Germany September 27, 1934

3 Claims. (Cl. 260—139)

The present invention relates to an improvement in the production of acetaldehyde from acetylene.

It has previously been proposed to produce acetaldehyde by a process wherein acetylene or gas mixtures containing acetylene are first led through solutions of so-called ansolvo acids (see Liebig's "Annalen der Chemie", vol. 455, pages 228 and following); while warming, the residual gas containing acetylene then being subjected to catalytic hydration in the gas phase, preferably after removal of the acetaldehyde formed.

The acid reaction of the so-called "ansolvo acids" is not based upon the decomposition of salts in aqueous solution by way of hydrolysis. The not too dilute solutions of certain salts contain true acids, which usually are called ansolvo acids. The character of these ansolvo acids is based upon the fact that they form complex compounds in which the metal atom is joined with the oxygen atom of the water by auxiliary valences. The existence of true salts of the ansolvo acids is a proof of their acid character. If the solutions of the so-called ansolvo acids are diluted, the acid reaction becomes weaker. Upon further dilution, the solutions at first become practically neutral. At this point, the so-called "ansolvo acids" are destroyed. Upon continued dilution hydrolysis of the salts may take place, whereby an acid reaction is effected which is quite different from that of the so-called ansolvo acids.

I have now found that in the first stage of the said process it is possible to employ instead of a solution of an ansolvo acid, a catalytic acid liquid containing mercury, as for example solutions of mercuric sulphate in sulphuric acid of the kind described in the U. S. Patent 1,151,928 or similar solutions containing metallic mercury.

This method of working offers the advantage that special devices for gas distribution are unnecessary; a gas distribution such as is obtained with a tower filled with rings is sufficient. In this improvement of the tow-stage process, non-purified electric arc acetylene may be employed because the impurities are either converted or retained by the catayltic solution in the first stage. A previous purification of the gas is therefore unnecessary whereas when employing solid catalysts alone it is essential. Since it is not necessary to obtain a high conversion of acetylene in the first stage of our new process it is possible to work with a high total throughput of acetylene, the unreacted acetylene leaving the catalytic liquid in the first stage of the reaction being converted into acetaldehyde in the second stage of this process.

The process according to this invention may also be employed for working up highly concentrated acetylene. The latter is usually led in circulation through the catalytic solution; in this manner the accompanying gases originally present in but small amounts in the acetylene become enriched and must be removed from the circulating gas, whereby a part of the acetylene is simultaneously lost as far as the production of acetaldehyde is concerned. If, however, according to this invention the said fraction of the gas be led in a second stage over a solid catalyst together with steam, the acetylene contained in the gas may also be used for the production of acetaldehyde. Such solid catalysts for this second stage are for example mixtures of difficultly reducible oxides containing a preponderance of basic constituents, as for example mixtures of aluminium oxide with tungstic acid and small amounts of zinc oxide (see for example U. S. Patent Nos. 1,856,639 and 1,926,575).

The following example will further illustrate how my said invention may be carried out in practice but the invention is not restricted to this example.

Example

A gas mixture which, in addition to 15.9 per cent of acetylene, contains mainly hydrogen is led at from 90° to 95° C. at a speed of 140 liters per hour through a tower filled with rings and containing 1.2 liters of a solution of ferric sulphate in diluted sulphuric acid which contains 37 grams of iron as ferric sulphate per liter, and 3 per cent of free sulphuric acid. Metallic mercury is distributed over the rings. The mixture leaves the tower with an acetylene content of 5 per cent. This acetylene is converted to acetaldehyde in a second tower containing 250 cubic centimeters of active carbon which is impregnated with dilute phosphoric acid (25 cubic centimeters of concentrated phosphoric acid having a specific gravity of 1.5 and 30 cubic centimeters of water) and mixed with metallic mercury. The gas leaving the first tower is mixed with from 2 to 3 per cent, by volume, of oxygen or a corresponding amount of air and led through the second tower at from 90° to 120° C. The oxygen is added to the gas in order to oxidize the mercury, and the mercury oxide thus formed is converted on the active carbon by the phosphoric acid present into the corresponding mercury salt. In this form the mercury compound effects the formation of acetaldehyde from acetylene and water, the latter being present in a sufficient amount, since the gas having passed the aqueous solution in the first tower contains an amount of steam sufficient for the said conversion.

What I claim is:—

1. A process for producing acetaldehyde by catalytic hydration of acetylene which comprises passing a gas mixture comprising acetylene, while warming, through a catalytic acid solution containing mercury and subjecting the residual gas to catalytic hydration in the gaseous phase.

2. A process for producing acetaldehyde by catalytic hydration of acetylene which comprises rapidly passing a gas mixture comprising acetylene while warming, through a dilute sulphuric acid containing a ferric salt and mercury and subjecting the residual gas to catalytic hydration in the gaseous phase.

3. A process for producing acetaldehyde by catalytic hydration of acetylene which comprises rapidly passing a gas mixture comprising acetylene, while warming, through a catalytic acid solution containing mercury and subjecting the residual gas to catalytic hydration in the gaseous phase.

ERNST EBERHARDT.